United States Patent
Lasko (10) Patent No.: US 11,482,785 B2
(45) Date of Patent: Oct. 25, 2022

(54) MAGNETO-DIELECTRIC DIPOLE

(71) Applicant: LYASKO RADIOELECTRONIC TECHNOLOGIES LIMITED LIABILITY COMPANY, Moscow (RU)

(72) Inventor: Paul Lasko, Podolsk (RU)

(73) Assignee: LYASKO RADIOELECTRONIC TECHNOLOGIES LIMITED LIABILITY COMPANY, Moscow (RU)

(*) Notice: Subject to any disclaimer, the term of this patent is extended or adjusted under 35 U.S.C. 154(b) by 0 days.

(21) Appl. No.: 17/023,519

(22) Filed: Sep. 17, 2020

(65) Prior Publication Data
US 2021/0028544 A1    Jan. 28, 2021

Related U.S. Application Data

(63) Continuation of application No. PCT/RU2019/000987, filed on Dec. 20, 2019.

(30) Foreign Application Priority Data

Jul. 25, 2019 (RU) .............. RU2019123434

(51) Int. Cl.
   *H01Q 7/08*       (2006.01)
   *H04B 1/40*       (2015.01)

(52) U.S. Cl.
   CPC ............. *H01Q 7/08* (2013.01); *H04B 1/40* (2013.01)

(58) Field of Classification Search
   CPC .............. H01Q 7/08; H01Q 7/06; H04B 1/40
   See application file for complete search history.

(56) References Cited

U.S. PATENT DOCUMENTS

| | | | |
|---|---|---|---|
| 2002/0003503 A1* | 1/2002 | Justice ............... | H01Q 7/08 343/788 |
| 2005/0134515 A1* | 6/2005 | Copeland ............ | H01Q 7/08 343/788 |
| 2007/0087787 A1* | 4/2007 | Washiro .............. | H04B 7/088 455/562.1 |
| 2009/0224608 A1* | 9/2009 | Cook ................... | H01Q 7/08 307/104 |
| 2009/0289860 A1* | 11/2009 | Lee ..................... | H01Q 23/00 343/788 |

* cited by examiner

*Primary Examiner* — Yuwen Pan
*Assistant Examiner* — Fatuma G Sherif
(74) *Attorney, Agent, or Firm* — Nixon & Vanderhye PC (57) ABSTRACT

The invention relates to antenna technology, especially, to electrically small transmitting and receiving antennas for operation at frequencies ELF-VHF. Magneto-dielectric dipole, being a transmitting and receiving antenna element, configured to be matched to a resonant frequency f, the antenna element comprised of an inductive winding configured to be connected to a power source and of an elongated magnetic core inserted through the inner space of the inductive winding and comprised of a ferrite material having mass and parameters sufficient to retain magnetic properties of the ferrite material within a magnetic field induced by the inductive winding when the inductive winding is fed by an electric current equivalent to a power of 0.0001 watts or higher at the resonant frequency f. Use of the invention improves mobility and performance of the antenna element when used either as a part of mobile radio station onboard a fast-moving vehicle or outdoors exposed to gusty winds.

19 Claims, 7 Drawing Sheets

MAGNETO-DIELECTRIC DIPOLE

CROSS-REFERENCE TO RELATED APPLICATIONS

The present application is a continuation of PCT/RU2019/000987 filed on Dec. 20, 2019, which claims the benefit of Russian Patent Application RU 2019123434 filed on Jul. 25, 2019, the entire contents of each of which are hereby incorporated herein by reference.

FIELD OF THE INVENTION

The invention relates to antenna technology, especially, to electrically small transmitting and receiving antennas for operation within a range of extremely low and very high frequencies (ELF-VHF).

BACKGROUND

A multi-element magnetic antenna for operation in low frequency and very low frequency range is known from the prior art (utility model RU No. 181783). Such antenna has the disadvantage of structural design complexity due to the fact that implementation of this solution requires designing and manufacturing mechanical appliances to fix the antenna elements rigidly relative to each other.

Two more magnetic antennas used for the low frequency and very low frequency band transmitting and receiving of electromagnetic signals are known from the prior art—transmitting linear magnetic antenna (RU 2428774 C1, IPC H01Q July 2006 publ. Sep. 10, 2011) and compact parametric antenna (U.S. Pat. No. 5,495,259A, publ. Feb. 27, 1996, IPC H01Q July 2006). Both these antennas belong to the class of Hertzian magnetic dipoles and have an external solenoid coil wound over a dielectric casing and a magnetic core made of ferrite material which is covered by the said casing along its entire length. The magnetic core of these antennas has predetermined values of magnetic and dielectric permeability to achieve the desired resonant frequency of the finished antenna.

The transmitting linear magnetic antenna (RU 2428774 C1, IPC H01Q July 2006, publ. Sep. 10, 2011) suffers from the drawback of strong dependence on availability of commercially produced ferrite cups (at present available as P or PM ferrite cups) and inevitable presence of air gaps between above said cups as well as hollow spaces in the interior of assembled magnetic core, which makes the transmission and reception less efficient and diminishes the radiation resistance due to magnetic core inhomogeneity. In addition, it is necessary to find a mean to rigidly fix the cups relative to each other in the case of assembling magnetic core from cups, and such fixation, in absence of any other suitable ways, can be made only using some kind of adhesive substance. However, addition of an adhesive composition, which usually is characterized by high values of the dielectric loss tangent, also negatively affects the quality of the antenna in the transmission mode.

In contrast, the compact parametric antenna (U.S. Pat. No. 5,495,259A, IPC H01Q July 2006, publ. Feb. 27, 1996) suffers from the disadvantage of antenna performance instabilities caused by vibrations and/or heating of liquid medium due to strong currents in solenoid winding, which makes it impractical to use a liquid magnetic and dielectric substance as the magnetic core in high power radio transmitters.

Besides, both above mentioned solutions and similar devices possess one common disadvantage of extremely low electromagnetic signal transmission efficiency, due to the fact that the ferrite core (or another applicable magnetic material) used in those is not designed to preserve useful magnetic properties within the magnetic field which is induced by the antenna's solenoid winding. Meaning, it has neither the total mass nor the intrinsic parameters sufficient to implement its technical purpose when the antenna input is fed by an electric current equal to power of 0.0001 watts or more at an antenna circuit's resonant frequency f.

SUMMARY OF THE INVENTION

The aim of the claimed technical solution is to miniaturize the Hertzian magnetic dipole-based transmitting and receiving antenna element for a specified resonant frequency within the range of extremely low and very high frequencies (ELF-VHF), which is capable of broadcasting within the said frequency range at a power level significant enough for radio communication, while preserving the radiation efficiency of such a small-sized dipole.

The technical result of the claimed solution is to improve transmitting and receiving performance of the antenna element used either as a part of mobile radio station onboard a fast-moving vehicle or outdoors under the conditions of strong breeze or gusty wind which could negatively affect a conventional antenna, while having the possibility to install the claimed element tangentially to a conductive surface, for example, a car roof.

This technical result is achieved by making the magneto-dielectric dipole, configured to be matched to a resonant frequency f, as a transmitting and receiving antenna element comprised of an inductive winding configured to be connected to an electric power source and of an elongated magnetic core inserted through an inner space of the inductive winding and comprised of a ferrite material having mass and parameters sufficient to retain magnetic properties of the ferrite material within a magnetic field induced by the inductive winding when the inductive winding is fed by an electric current equivalent to a power of 0.0001 watts or higher at the resonant frequency f.

In one particular embodiment, the claimed technical solution contains an electrically conductive body in its inner space configured to be connected with another conductor and/or ground.

In one particular embodiment of the claimed technical solution, the magnetic core inserted through the inner space of the inductive winding comprises a hollow elongated body configured to contain within its hollow space a dielectric material or substance.

In one particular embodiment of the claimed technical solution, outer surface of the magnetic core is covered with a layer of dielectric material or substance.

In one particular embodiment of the claimed technical solution, the magnetic core of antenna element is assembled from a plurality of parts that are rigidly fixed relative to each other.

In one particular embodiment of the claimed technical solution, the magnetic core of antenna element is assembled from a plurality of parts separated by interlayers of a dielectric material or substance.

In one particular embodiment of the claimed technical solution, the inductive winding is configured with an option to electromechanically change number of turns affecting a final value of the winding inductance.

In one particular embodiment of the claimed technical solution, the antenna element is configured to be matched to the resonant frequency f by the means of electrical connection to a matching circuit.

In one particular embodiment of the claimed technical solution, the inductive winding and the magnetic core are made with a degree of freedom to slide relative to each other along a joint longitudinal axis, by means of a manual or electromechanical device that provides independent movement and fixation of the inductive winding in a desired position along the elongated magnetic core.

In one particular embodiment of the claimed technical solution, the magneto-dielectric dipole, being a transmitting and receiving antenna element, is configured to be connected to a plurality of other antenna elements in parallel, in series, or in a combined parallel and serial manner, to form a single resonant circuit configured to be matched to the resonant frequency f and, configured to be connected to an output of a common power source, wherein each antenna element is located at a distance d relative to the closest element, and d is by orders of magnitude smaller than the wavelength that corresponds to the resonant frequency f.

More specifically, the technical result of the claimed invention is achieved by reducing dimensions of the magnetic antenna (as presented by dimensions of the inductive winding) due to the use of magnetic core comprised predominantly of ferrite material, as well as by the use of said ferrite material with selected mass and electromagnetic parameters such that this ferrite material would retain useful magnetic properties in the magnetic field induced by the inductive winding fed by an electric current equivalent to power of 0.0001 watts or more at antenna circuit's resonant frequency f (within the above specified frequency range) in order to broadcast electromagnetic waves, which makes it possible to apply such magnetic antenna as a transmitting antenna at the specified resonant frequency f and at applied power levels considerable enough for radio communication.

In order to increase the applicable antenna feed power while avoiding the emergence of significant nonlinear effects in the ferrite material, it is possible to increase the mass of the ferrite material occurring within limits of the magnetic field induced by the inductive winding.

There are several ways to increase the mass that can be followed either individually or simultaneously:

a) Increase in diameter and/or length of magnetic core, with a proportional increase in the ferrite material fraction in this core;

b) Assembling the antenna from a plurality of antenna elements connected in parallel, in series, or combined in parallel and in series, to form a single two-dimensional or three-dimensional antenna system, which can contain a larger total mass of ferrite material within limits of the magnetic field induced by it, as compared to a single antenna element of the same kind.

Based on above described ways as well as the choice of ferrite material in accordance with optimal parameters for the specified resonant frequency f, to which the resonant circuit is matched (including, if necessary, the use of a matching circuit), it becomes now possible to make an efficient transmitting antenna with physical dimensions by orders of magnitude smaller than the radiated wavelengths in the ELF-VHF bands.

BRIEF DESCRIPTION OF THE DRAWINGS

These and other features and advantages of the invention will become better understood when considered in conjunction with the following detailed description and by referring to the appended drawings, wherein.

Numbers in the drawings indicate the following items:

1—magnetic core; 2—inductive winding; 3—magnetic field induced by the inductive winding fed by applied electric current equivalent to power of 0.0001 watts or more; 4—power supply; 5—matching circuit; 6—constituent part of magnetic core; 7—electrically conductive body; 8—fraction of magnetic core volume made of a dielectric material or substance; 9—fraction of magnetic core volume made of ferrite material; 10—antenna element; 11—device providing movement and fixation of the inductive winding in desired position along the length of the magnetic core body.

DETAILED DESCRIPTION OF THE INVENTION

Figure 1:
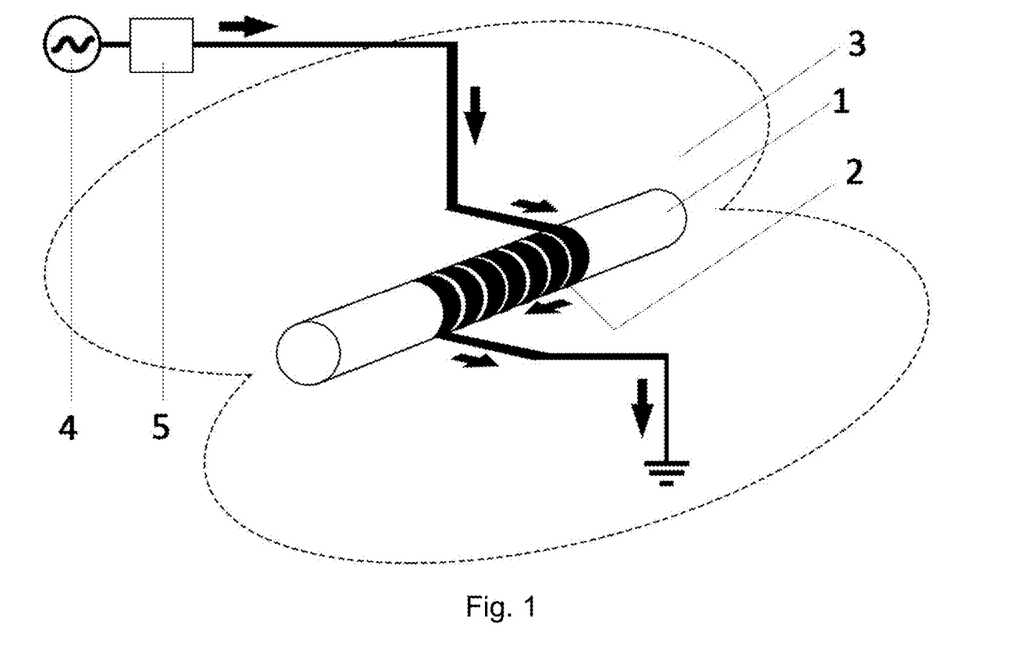
FIG. 1 is a basic design of a magneto-dielectric dipole wherein its resonant circuit is consisting of a single antenna element.

A magneto-dielectric dipole represents a resonant circuit matched to a resonant frequency f. In a simplest case, it consists of a single antenna element (10) containing an inductive winding (2) with one of the inputs being able to be connected to a power source (4).

A magnetic core (1), inserted through the inner space of the inductive winding (2), is made in such fashion that its volume contains ferrite material, meaning, is entirely or predominantly consisting of a ferrite material. In the same time, mass and electromagnetic parameters of said ferrite material (9) constituent of the magnetic core (1) are selected in such way that this said ferrite material (9) would retain useful magnetic properties in the magnetic field (3) induced by the inductive winding (2) when said inductive winding (2) is fed by an electric current equivalent to power of 0.0001 watts or more from the power source (4) at a resonant frequency f, to which the magneto-dielectric dipole is matched.

The magnetic core (1) is inserted through the inner space of the inductive winding (2) and has an elongated shape, that is, it has a length (L) several orders of magnitude greater than its own cross-section (S). Such design of magnetic core (1) is the most optimal for increasing the mass of ferrite material while maintaining the decrease of antenna element's windage and wind load exposure.

In addition, such design allows to extremely extend the path of the magnetic field (3) lines, induced by the inductive winding (2), through the magnetic core body (1), while at the same time, it also allows to increase the maximum applicable feed power (P) at the input of inductive winding (2), at which the useful magnetic properties of the ferrite material (9) constituent of the magnetic core (1)—are retained within the induced magnetic field (3) at a resonant frequency f, to which the magneto-dielectric dipole is matched.

For above described reasons, it becomes possible to apply the claimed invention as a part of transmitting or transmitting and receiving radio station.

FIG. 1 below shows one embodiment of the magneto-dielectric dipole comprising:

magnetic core (1) inserted through the inner space of the inductive winding (2);

power supply (4) connected to one of inputs of the inductive winding (2), if necessary, through a matching circuit (5). A commercially available radio-amateur transceiver can serve an example of said power supply. To transmit an electromagnetic signal, an electric current is fed from the output of power supply (4) to the input of inductive winding (2) (which, in fact, is input of the antenna element (10)). Direction of the electric current is indicated by arrows.

Second input of the inductive winding (2) is connected to the ground. The magnetic core (1) has the length (I) by orders of magnitude larger than its cross-section (s).

The magnetic core (1) volume contains ferrite material in such total mass and at the same time, of such specifically selected electromagnetic parameters, so that the mass of this said ferrite material (9) that forms the volume of the said magnetic core (1) retains useful magnetic properties within the magnetic field (3) induced by the inductive winding (2) of the magneto-dielectric dipole, when fed by an electric current from the power source (4) at a resonant frequency f for the purpose of radio transmission.

Figure 2:
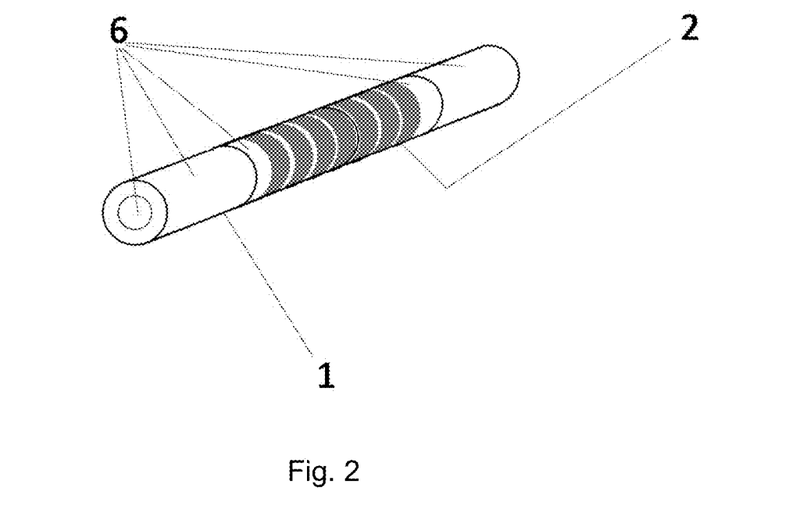
FIG. 2 shows the embodiment of antenna element of a magneto-dielectric dipole with magnetic core assembled from a plurality of parts that are rigidly fixed relative to each other.

FIG. 2 presents another embodiment of magneto-dielectric dipole comprising a single antenna element (10), wherein magnetic core (1) is assembled from a plurality of parts (6) that are rigidly fixed relative to each other in order to compose a single core (1).

Figure 3:
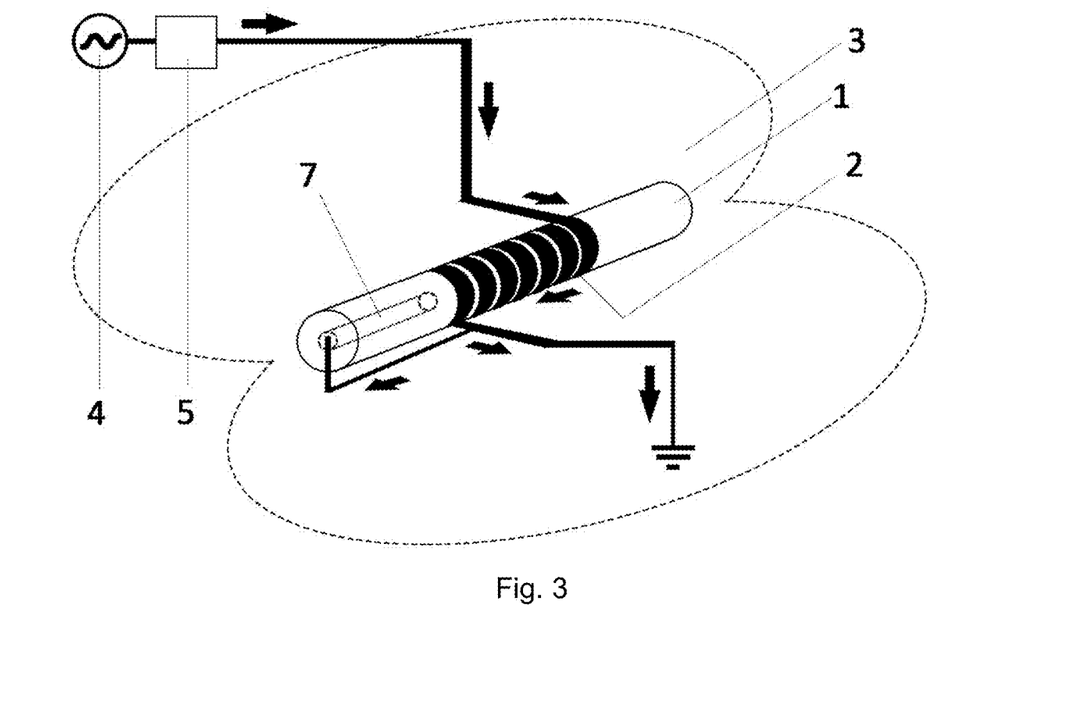
FIG. 3 shows another embodiment of antenna element of a magneto-dielectric dipole wherein the core contains an electrically conductive body or material configured to be connected with another conductor.

FIG. 3 illustrates an embodiment of antenna element (10) comprising an electrically conductive body (7) placed within the inner space of the antenna element (10) and configured to be connected to another conductor, in the particular case shown in FIG. 3, to one of inputs of the inductive winding (2). In particular, electrically conductive body (7) can be made in the form of a single bearing rod suitable to be fitted over with parts (6), which are specially selected, for example, among commercially available ferrite cores based on their parameters so that they contributed in the total mass of ferrite material within magnetic core (1).

Figure 4:
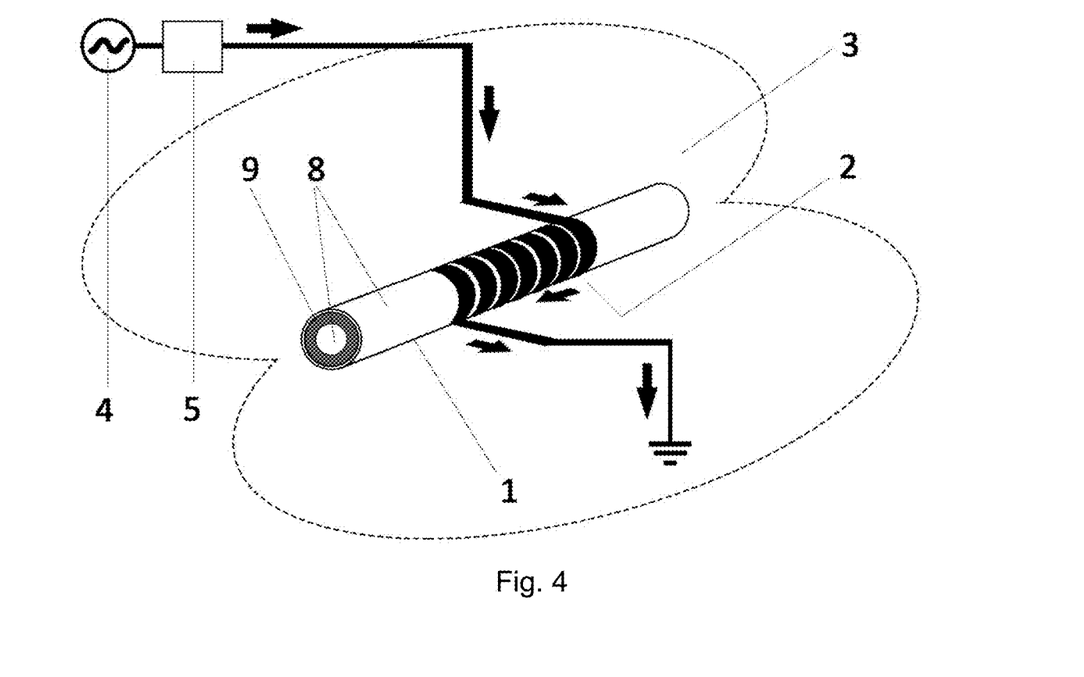
FIG. 4 shows an embodiment of antenna element of a magneto-dielectric dipole, in which part of magnetic core's mass is made of ferrite material while another part is made of a dielectric material or substance.

FIG. 4 illustrates an embodiment of the antenna element (10) comprising a core (1) partially made of a dielectric non-ferrite material or substance (8). In this embodiment, as shown in the figure, ferrite material (9) constituent of the magnetic core (1) has the shape of a hollow elongated body containing a dielectric material or substance (8) within the inner space and is covered with a layer of the same dielectric material or substance (8) from the outside in order to provide protection of core's (1) ferrite material constituent parts against physical damages (such as chipping, cleaving with violation of geometry, etc.).

Dielectric material or substance (8) in this embodiment of the claimed technical solution can be implemented in the form of solid parts. In other particular embodiments, a dielectric material or substance (8) can be implemented in the form of powder or liquid, such as, but not limited to, ethyl alcohol, or even in the form of gas, such as, but not limited to, air.

Figure 5:
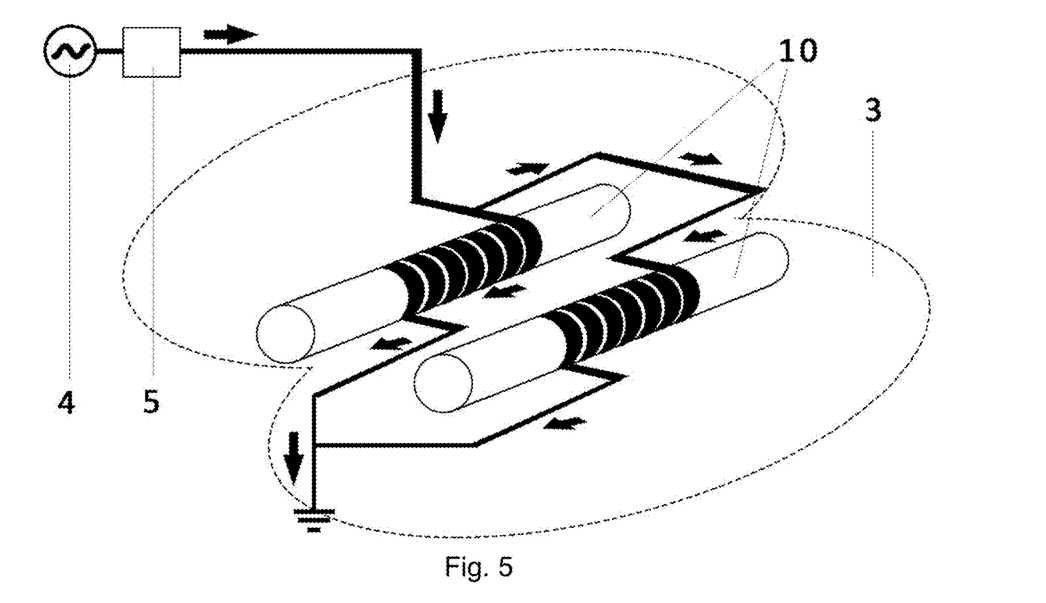
FIG. 5 is an embodiment of the magneto-dielectric dipole formed by a plurality of antenna elements connected in parallel.

FIG. 5 illustrates an embodiment of magneto-dielectric dipole represented by a resonant circuit consisting of a plurality of antenna elements (10) with inputs interconnected with each other in parallel and outputs connected to a common power source (4), if necessary, through a matching circuit (5).

Figure 6:
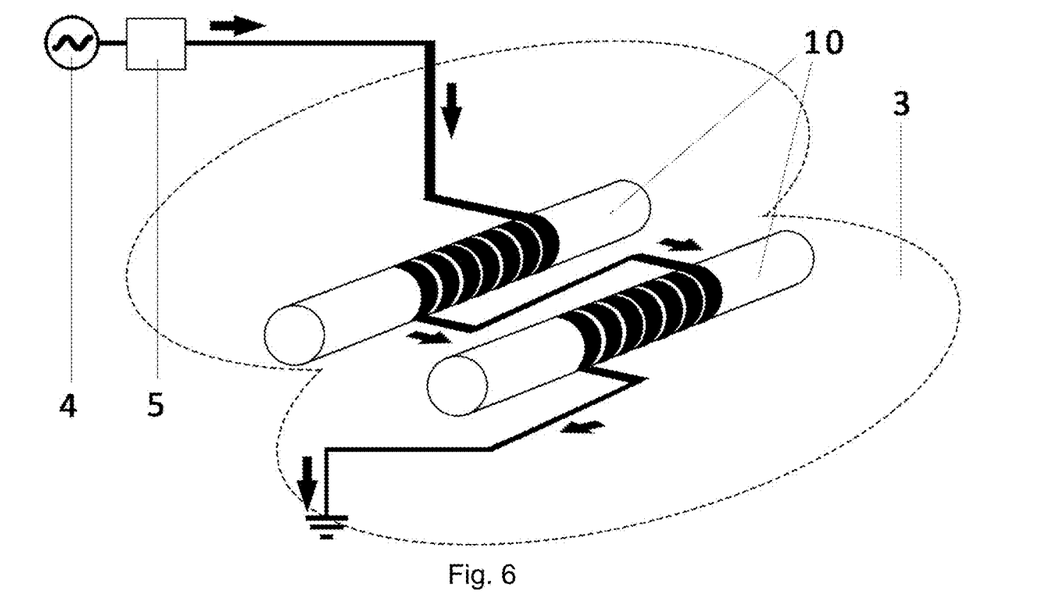
FIG. 6 is an embodiment of the magneto-dielectric dipole formed by a plurality of antenna elements connected in series.

FIG. 6 illustrates an alternative embodiment of multi-element magneto-dielectric dipole represented by a resonant circuit consisting of a plurality of antenna elements (10) with inputs interconnected with each other in series. In this embodiment, input of the first inductive winding (2) in the resonant circuit of antenna element (10) is connected to the output of power source (4) (if necessary, through the matching circuit (5)), while the output of this inductive winding (2) is connected to the input of inductive winding (2) of the second antenna element (10), and so on until the last antenna element (10), which has its inductive winding (2) output connected to the ground.

Figure 7:
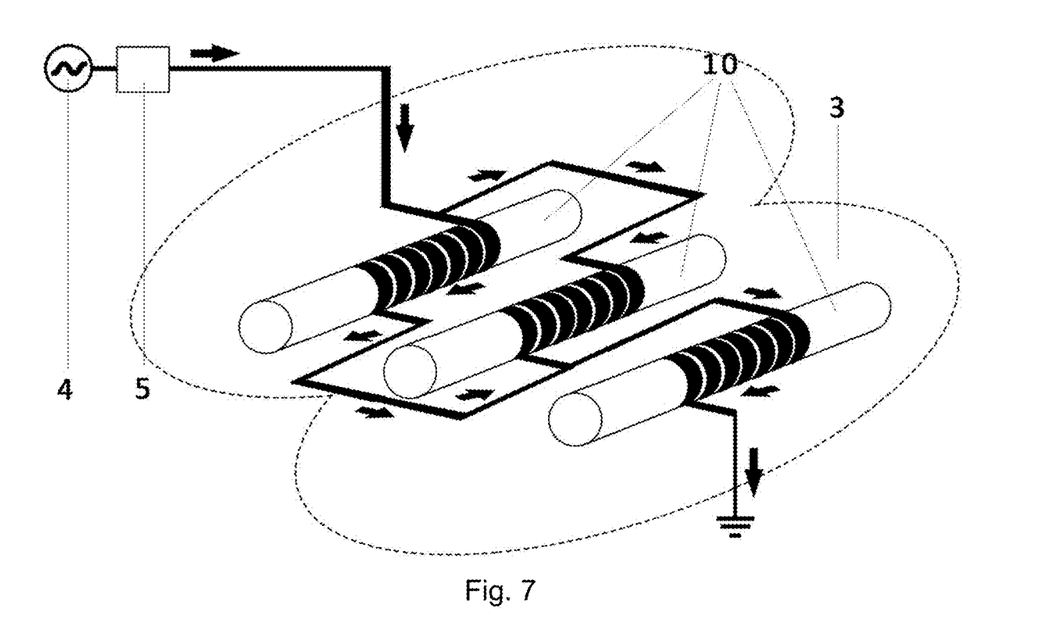
FIG. 7 is an embodiment of the magneto-dielectric dipole formed by a plurality of antenna elements connected in a combined parallel and serial way.

FIG. 7 illustrates another alternative embodiment of multi-element magneto-dielectric dipole represented by a resonant circuit consisting of a plurality of antenna elements (10) that have their inputs interconnected in a combined manner in parallel and in series.

In the illustrated example, the magneto-dielectric dipole consists of 3 antenna elements (10), in which inductive windings (2) of 2 antenna elements have their inputs interconnected in parallel and connected to output of the common voltage source (4), while their outputs are interconnected in parallel as well, and connected to input of the inductive winding (2) of the third antenna element (10), which has its output connected to the ground.

Figure 8:
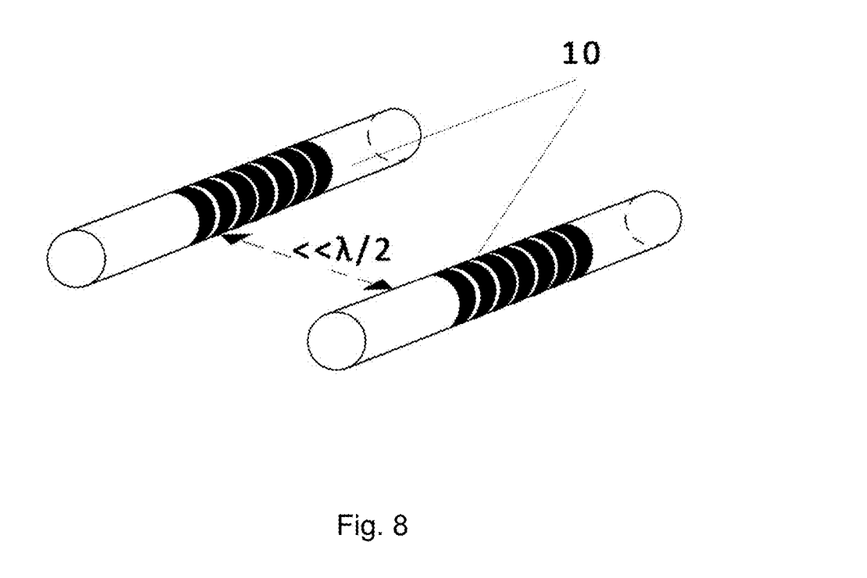
FIG. 8 illustrates the mutual arrangement of antenna elements in a multi-element embodiment of magneto-dielectric dipole, such that each antenna element is at a distance from any other element, by orders of magnitude smaller than the wavelength corresponding to the resonant frequency f to which the magneto-dielectric dipole is matched.

FIG. 8 illustrates relative arrangement of antenna elements (10) in multi-element magneto-dielectric dipole that obeys the condition of antenna elements (10) spacing by orders of magnitude smaller than the wavelength ($\ll \lambda/2$) corresponding to the specified resonant frequency f, to which the magneto-dielectric dipole is matched.

Figure 9:
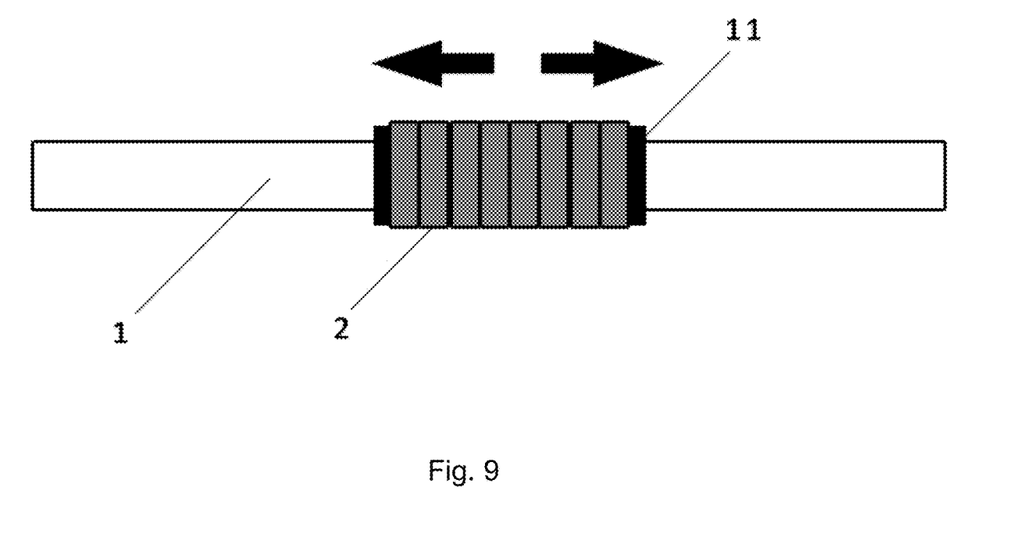
FIG. 9 is an embodiment of antenna element of a magneto-dielectric dipole with inductive winding and the magnetic core made with a degree of freedom to slide relative to each other along a joint longitudinal axis, by means of a manual or electromechanical device that provides independent movement and fixation of the inductive winding in the desired position along the length of the magnetic core body.

FIG. 9 illustrates an embodiment of the antenna element (10) with inductive winding (2) and magnetic core (1) that are made with a degree of freedom to slide relative to each other along the longitudinal axis by means of a manual or electromechanical device (11), in this particular case, presented in the form of a hollow tubular sleeve sliding along the long body of the core (1), which, under targeted manual or electromechanical action is driving the inductive winding (2) after itself along the core body, which ensures independent movement and fixation of the inductive winding (2) in the desired position along the length of the core body (1).

The aim of the claimed invention is achieved by reducing dimensions of the magnetic antenna due to the use of magnetic core entirely or predominantly composed of ferrite material. In all examples below, magnetic cores were intended to be implemented in transmitting and receiving antenna units at frequency 100 kHz.

In the following Examples, magnetic core was entirely composed of a ferrite material. Parameters of ferrite grades disclosed in the Examples are shown in Table 1, wherein HH designates nickel-zinc ferrites and HM designates manganese-zinc ferrites.

TABLE 1

Parameters of ferrite grades disclosed in the Examples.

| Ferrite grade | $f_c$, MHz, at tan δ: | | $\mu_{max}$ | $H_{max}$, A/m, at $\mu_{max}$ | $B_m$, T | $B_r$, T at $H_{max}$ = 800 A/m | $H_c$, A/m |
|---|---|---|---|---|---|---|---|
| | 0.1 | 0.02 | | | | | |
| 100HH | 30.0 | 15.0 | 850 | 120 | 0.44 | 0.290 | 66.0 |
| 400HH | 3.60 | 1.50 | 1100 | 64 | 0.25 | 0.120 | 64.0 |
| 400HH1 | 6.00 | 3.90 | 1400 | 100 | 0.28 | 0.160 | 48.0 |
| 600HH | 1.500 | 0.700 | 1600 | 56 | 0.31 | 0.140 | 32.0 |
| 1000HH | 0.400 | — | 3000 | 32 | 0.27 | 0.150 | 20.0 |
| 2000HH | 0.100 | — | 7000 | 12 | 0.25 | 0.120 | 8.0 |
| 1000HM | 0.600 | 0.200 | 1800 | 40 | 0.35 | 0.110 | 20.0 |
| 1500HM | 0.600 | 0.100 | 2500 | — | 0.35 | 0.110 | 24.0 |
| 2000HM | 0.500 | 0.050 | 3500 | 20 | 0.38 | 0.130 | 24.0 |
| 3000HM | 0.100 | 0.002 | 3500 | 20 | 0.35 | 0.120 | 12.0 |

Based on above described ferrite grades, several implementations of the claimed invention have been tested.

Example 1 of implementation of the invention based on the 3000HM ferrite grade with the following parameters:
Initial magnetic permeability=3000
Magnetic loss tangent at frequency 100 kHz=0.002
Coercive force derived from induction at the frequency 100 kHz=12 A/m
Density=4800 kg/m^3
Geometric dimensions:
Cylinder radius=100 mm
Cylinder height=1000 mm
Cylindrical core mass=150 kg.

For this configuration, strength of alternating magnetic field induced by the inductive winding in the core was calculated with the aim to analyze magnetic properties of the material depending on the antenna feed power. Then the antenna efficiency was estimated using analytical formulas derived in the course of calculations. The efficiency value was found depending on initial magnetic permeability, magnetic loss tangent, and geometrical dimensions of the cylindrical core. Alternating magnetic field was calculated using equations derived in the physical models of elementary magnetic vibrator.

Figure 11:
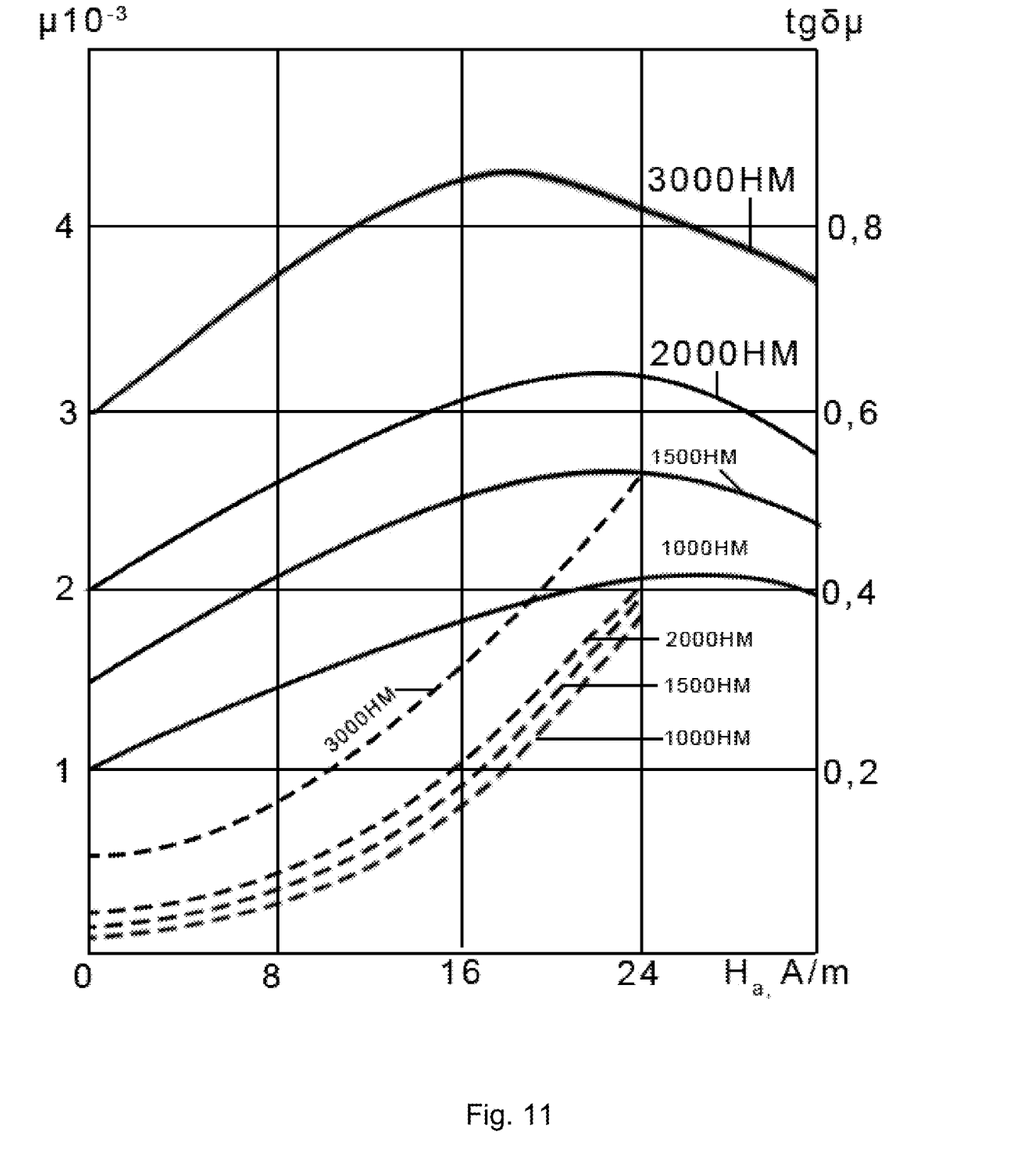
FIG. 11 is the graph representing dependences of magnetic permeability (continuous line) and magnetic loss tangent (dashed line) on alternating magnetic field strength at the frequency f=0.1 MHz for specially selected low frequency manganese-zinc ferrite grades (1000HM, 1500HM, 2000HM, 3000HM), parameters of which are disclosed in Table 1.

The following result was obtained: at the power feeding to the inductive winding equal to 400 W, maximum value of the alternating magnetic field strength in the structure is: H=0.937 A/m. It can be seen from the magnetic permeability vs. alternating magnetic field strength plot shown in FIG. 11 that the 3000HM grade material with such mass substantially retains its magnetic properties.

Example 2 of implementation of the invention based on the 400HH ferrite grade:
Initial magnetic permeability=400
Magnetic loss tangent at frequency 100 kHz=0.004
Coercive force derived from induction at the frequency 100 kHz=64 A/m
At the power feeding to the inductive winding equal to 400 W, maximum value of the alternating magnetic field strength in the structure is: H=7.3033 A/m.

Figure 10:
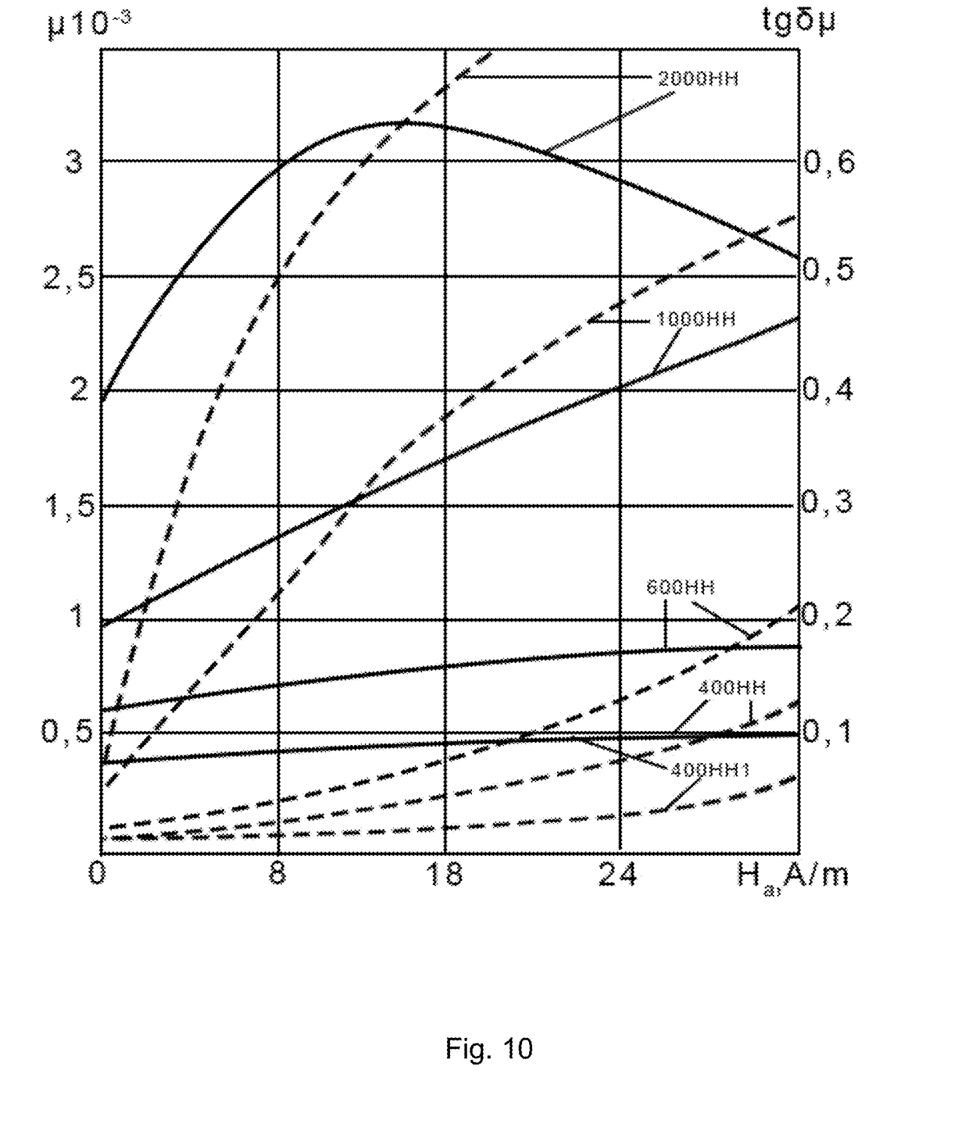
FIG. 10 is a graph representing dependences of magnetic permeability (continuous line) and magnetic loss tangent (dashed line) on alternating magnetic field strength at the frequency f=0.1 MHz for specially selected low frequency nickel-zinc ferrite grades (400 HH, 400 HH1, 600HH, 1000HH, 2000HH), parameters of which are disclosed in Table 1.

It can be concluded from the magnetic permeability vs. alternating magnetic field strength plot presented in FIG. 10 that the 400HH grade material with such mass does not enter saturation.

Example 3 of implementation of the invention based on the 2000HH ferrite grade:
Initial magnetic permeability=2000
Magnetic loss tangent at frequency 100 kHz=0.2
Coercive force derived from induction at the frequency 100 kHz=8 A/m
At the power feeding to the inductive winding equal to 400 W, maximum value of the alternating magnetic field strength in the structure is: H=1.4323 A/m.

It can be seen from the magnetic permeability vs. alternating magnetic field strength plot presented in FIG. 10 that 2000HH ferrite grade material with such mass does not enter saturation, but losses in the material grow very significantly.

All of the above described examples of the invention are feasible to be used onboard a fast-moving vehicle, while being installed tangentially over its metallic body at a minimum height—in contrary to a conventional ¼ wavelength wire antenna which would have to be at least 750 meters long in order to operate at a frequency 100 KHz.

Testing of claimed invention in practice have shown that the stable radio transmission at the frequency 10.110 MHz with standing-wave ratio (SWR) as low as 1.2:1 and 100% power feed to the inductive winding from output of the commercially available transceiver ICOM-7300 (about 120 watts) is reached when using ferrite parts of a specially selected high-frequency grade constituting about 90% of the magnetic core mass, the core being cylindrical with dimensions (L)=1 meter, (D)=0.04 m and mass of about 2.5 kg. In these tests, level of the emitted signal was comparable with signal emitted by the conventional mobile whip antenna with a height of 270 cm.

Parameters of the experimentally assembled core of the above-mentioned antenna prototype make it possible to reach similar matching and radiation efficiency (while using an appropriate matching element or an automatic matching device) also at higher part of HF frequency spectrum, namely, 27-30 MHz. Consequently, it can be concluded that according to the claimed invention it is possible develop a functional mobile ferrite transmitting antenna with a matching device that provides a possibility of its dynamic adjustment and practical use for transmission within a sufficiently wide frequency range.

In particular, in testing the aforementioned antenna, a signal level as high as 36.5 mA/m at the distance of 40 meters (3.7λ) was registered using the MDF930X direction-finding antenna when feeding said transmitting antenna with 100% power (about 120 watts) from output of the commercially available transceiver ICOM-7300 at the frequency of 28.250 MHz, with standing-wave ratio (SWR) as low as 1.2:1. Thus, at the distance of 40 meters, a signal with the level of 0.1*36.5*377*10^(−3)=1.38 V/m was received, whence it follows that the radiated power Prad was equal to 49.38 watts (41.15% of feed power at the transceiver output).

This fact indicates on high radiation efficiency of experimental antenna in relation to its dimensions, considering the frequency used, and, consequently, on successful achievement of the aim of the claimed invention. If an experimental antenna was manufactured using a ferrite material with inappropriate values of inherent parameters (for example, inappropriate for the frequency, which was set during transmission) or insufficient mass, —the ferrite core material would saturate, which would lead to increase of loss resistance and decrease of radiation resistance, and, as a result, to a low radiation efficiency of the antenna and its inapplicability for long-range radio transmission.

Test results show a significant potential for industrial design, production and applications of antennas based on the claimed invention.

Modern powder metallurgy has a sufficient experience in supplying the world and domestic markets with a wide range of commercially produced ferrite cores with various specified parameters, which can be used for experimental designing and subsequent manufacturing of novel fully functional transmitting antennas and antenna systems for VLF-VHF frequency bands based on the ferrite rods (solid or composed from identical parts) according to present invention. This disclosure has confirmed experimentally in both laboratory conditions and field trials the possibility of implementation and practical use of such antennas for signal transmission. Intrinsic parameters of any ferrite material depend on both frequency of the alternating magnetic field and temperature. Taking this dependence into account, ferrite material is gathered in such mass that enables it to retain useful magnetic properties at the selected frequency range at the desired input power.

Compared to conventional magnetic transmitting and receiving antennas in the form of a single-coil or multi-coil loop, the claimed invention is possessing improved mobile characteristics, namely, possibility of application onboard of a fast-moving vehicle.

In addition, designing of the supporting frame for the winding and of the external protective casing of the claimed antenna becomes simpler due to significantly smaller cross-section of the exciting circuit (inductive winding) at VHF frequency band and lower, which simultaneously enables the possibility of a more rigid winding fixation, protecting it from wind load and vibrations that can negatively affect the stability of antenna tuning at a desired frequency.

In turn, as compared with conventional magnetic ferrite core based antennas, the claimed invention has improved transmission characteristics due to the use of an elongated core consistent of ferrite material, which has been selected with an appropriate electromagnetic parameters and gathered with a total mass, that together allow the core to retain magnetic properties in a magnetic field induced by the antenna inductive winding when fed by an electric current equal to power of 0.0001 watts or more at the antenna circuit's resonant frequency f.

As compared with conventional mobile whip antennas, the claimed invention offers a significantly improved mobile and operational performance due to the fact that it is (in the most common scenario) a horizontally laid body that does not require physical manipulation to bring the excitation circuit into operational readiness. This result is provided by that the physical position of the antenna's elements according to the claimed invention, required for optimal operation in any receiving/transmitting mode, does not differ from their position best suited for transportation onboard of a fast-moving vehicle, while meeting the following conditions:

a) All mechanical impacts (vibration, air resistance) on antenna's radiating elements are minimized;

b) Strong mechanical shocks caused by physical collisions with external objects (bridges, transport, etc.) are precluded;

c) Maximum concealment is provided.

In one particular embodiment of the claimed technical solution, the magneto-dielectric dipole is formed of a plurality of antenna elements made with possibility of connecting to each other in parallel, in series, or in a combined parallel and serial manner while the antenna elements are being arranged in such a way that each antenna element was at a distance d from the closest element by orders of magnitude smaller than the wavelength corresponding to the specified resonant frequency f, to which the resonant circuit is matched. This distance between antenna elements is required for making phase difference between radiating elements close to zero.

In one particular embodiment of the claimed technical solution, the inductive winding and the magnetic core are made with a degree of freedom to slide relative to each other along the longitudinal axis, by means of a manual or electromechanical device that provides independent movement and fixation of the inductive winding in the desired position along the length of the magnetic core body. Such arrangement can be used for additional, smooth dynamic tuning of the antenna to the desired resonant frequency f.

The invention claimed is:

1. A transmitting and receiving antenna element, configured to be matched to a resonant frequency f, the antenna element comprised of an inductive winding configured to be connected to a power source and of an elongated magnetic core inserted through the inner space of the inductive winding and comprised of a ferrite material having mass and parameters sufficient to retain magnetic properties of the ferrite material within a magnetic field induced by the inductive winding when the inductive winding is fed by an electric current equivalent to a power of 120 watts or higher at the resonant frequency f.

2. The transmitting and receiving antenna element according to claim 1, further comprising an electrically conducting body configured to be connected to another conductor and/or to ground.

3. The transmitting and receiving antenna element according to claim 1, wherein the elongated magnetic core comprises a hollow elongated body configured to contain within its hollow space a dielectric material or substance.

4. The transmitting and receiving antenna element according to claim 1, wherein an outer surface of the elongated magnetic core is covered with a layer of a dielectric material or substance.

5. The transmitting and receiving antenna element according to claim 1, wherein the elongated magnetic core of the antenna element is assembled from a plurality of parts that are rigidly fixed relative to each other.

6. The transmitting and receiving antenna element according to claim 1, wherein the elongated magnetic core of the antenna element is assembled from a plurality of parts separated by interlayers of a dielectric material or substance.

7. The transmitting and receiving antenna element according to claim 1, wherein the inductive winding is configured with an option to electromechanically change a number of turns affecting a final value of the winding inductance.

8. The transmitting and receiving antenna element according to claim 1, wherein the antenna element is configured to be matched to the resonant frequency f by an electrical connection to a matching circuit.

9. The transmitting and receiving antenna element according to claim 1, wherein the inductive winding and the magnetic core are made with a degree of freedom to slide relative to each other along a joint longitudinal axis, via a manual or electromechanical device that provides independent movement and fixation of the inductive winding in a desired position along the elongated magnetic core.

10. The transmitting and receiving antenna element according to claim 1, being connectable to a plurality of other antenna elements according to claim 1 in parallel, in series, or in a combined parallel and serial manner, to form a single resonant circuit matched to the resonant frequency f and, configured to be connected to an output of a common power source, wherein each antenna element is located at a distance d relative to the closest element, and d is by orders of magnitude smaller than the wavelength that corresponds to the resonant frequency f.

11. The transmitting and receiving antenna element according to claim 1, wherein the resonant frequency f is higher than 30 kHz.

12. The transmitting and receiving antenna element according to claim 1, wherein the resonant frequency f is within the range of 30 MHz to 300 MHz.

13. The transmitting and receiving antenna element according to claim 1, wherein the resonant frequency f is higher than 30 kHz but lower than 300 MHz.

14. The transmitting and receiving antenna element according to claim 1, wherein the ferrite material has mass and parameters sufficient to retain magnetic properties of the ferrite material within the magnetic field induced by the inductive winding when the inductive winding is fed by an electric current equivalent to a power of 400 watts at the resonant frequency f.

15. The transmitting and receiving antenna element according to claim 14, wherein the resonant frequency f is 100 kHz.

16. The transmitting and receiving antenna element according to claim 1, being configured for radio broadcasting.

17. The transmitting and receiving antenna element according to claim 1, being Hertzian Magnetic Dipole-based transmitting and receiving antenna.

18. The transmitting and receiving antenna element according to claim 1, wherein:
the transmitting and receiving antenna element is configured for radio broadcasting; and
the transmitting and receiving antenna element is a Hertzian Magnetic Dipole-based transmitting and receiving antenna.

19. The transmitting and receiving antenna element according to claim 1, wherein:
the resonant frequency f is higher than the ELF band and no greater than the VHF band; and
the transmitting and receiving antenna element is a Hertzian Magnetic Dipole-based transmitting and receiving antenna.

* * * * *